Oct. 1, 1957  H. BAUMGARTNER  2,808,467
RADIO-RECEIVER WITH TUNING INDICATION WHEN LISTENING
AND VOLUME INDICATION WHEN RECORDING
Filed June 16, 1953
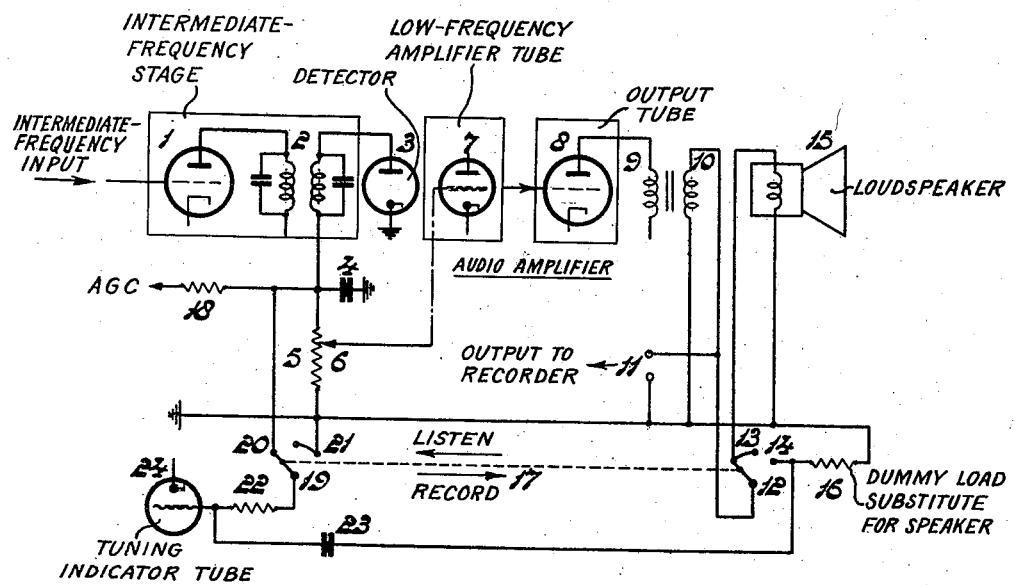
INVENTOR
HEINRICH BAUMGARTNER
BY
AGENT United States Patent Office
2,808,467
Patented Oct. 1, 1957

2,808,467

RADIO-RECEIVER WITH TUNING INDICATION WHEN LISTENING AND VOLUME INDICATION WHEN RECORDING

Heinrich Baumgartner, Vienna, Austria, assignor, by mesne assignments, to Hartford National Bank and Trust Company, Hartford, Conn., as trustee Application June 16, 1953, Serial No. 362,107

4 Claims. (Cl. 179—100.11)

The present invention relates to radio receivers having optical indication of tuning. More particularly, the invention relates to radio receivers having optical indication of tuning in which the audio-frequency voltage set up at the loudspeaker is perceptible not only acoustically, but also optically.

In those cases in which, according to one of the various known methods, for example, the method by which a magnetogram carrier is provided with a record, the audio-frequency voltage supplied at the output of a radio receiver is to be recorded, there is a need for observing the value of the audio-frequency voltage. This requirement follows from the fact that, in recording audio-frequency voltages by one of the known methods, for example, the said magnetic method, in order to avoid overcontrol of the recording members, the alternating audio-frequency voltage set up at the recording device must not exceed predetermined maximum values dependent upon the recording material, but must on the other hand be as high as possible, in order to obtain maximum volume in the reproduction of the recording material.

For the observing it is possible at first to utilize directly the sound impression produced by the loudspeaker. However, such an acoustic observation of the alternating audio-frequency voltage set up at the output of the receiver is very inaccurate. In sound recording the simultaneous acoustic reproduction by means of a loudspeaker is in many cases also detrimental or undesirable.

It is known to make perceptible not only acoustically but also optically the alternating audio-frequency voltage occurring at the output of the receiver.

Optical indicating devices which are used as such are, for example, pointer instruments, gaseous discharge tubes or electronic tuning indicator tubes known under several names, among which is "magic eye." Said indicating devices are used not only for observing the volume of amplifiers, but also for indicating the correct tuning of receivers having automatic sensitivity control.

For optical indication of the alternating audio-frequency voltage occurring at the output of the receiver it would be possible in this connection to incorporate additional indicating devices. This implies an increase of material and the need for a larger volume for incorporating the structural elements required, so that the radio receiver would become more expensive. Furthermore, receivers which in themselves already comprise optical tuning indicators thus exhibit the disadvantage that with the additional incorporation of devices for observation of volume the operation of the receiver is rendered difficult and occasions errors for the layman.

According to the invention, in a radio receiver having optical indication of tuning, the means serving for the optical indication of tuning, after being switched over, are used for the optical observation of volume.

Now, when the tuning member is switched over, the observation may be effected acoustically via the loudspeaker at the output of the receiver and optically via the indicating member.

However, it may also be desirable that the loudspeaker be made wholly or partially inoperative when switching over to the optical regulation of control. The switching operation may in this case be accompanied by a variation in the output of the receiver such that, instead of the loudspeaker, a spare resistor of corresponding value is switched in. However, as an alternative, it is possible to switch-in a combination of the loudspeaker and resistors instead of the loudspeaker only. When the correct value of the resistance is obtained, the reproduction by the loudspeaker may thus be effected at a considerably lower strength, so that the volume may be tested either acoustically or optically, or acoustically and optically, since the disadvantages occurring at full volume are avoided because of the decrease in volume.

In order that the invention may be readily carried into effect, it will now be described with reference to the accompanying drawing, wherein the single figure is a schematic diagram of a preferred embodiment of the arrangement of the present invention.

The figure shows in simplified form the last stages of a superheterodyne receiver. The high-frequency voltages supplied by an intermediate-frequency tube 1 in an intermediate-frequency stage are transferred, by way of an intermediate-frequency transformer 2, to a diode 3. A direct voltage corresponding to the mean value of the intermediate-frequency amplitude and the audio-frequency voltage corresponding to the modulation occur across a resistor 5 connected to the diode 3 with which a capacitor 4 is connected in parallel. The audio-frequency voltage, by way of a sliding contact 6 on resistor 5, is tapped with the desired adjustable value and supplied to the grid of a low-frequency amplifying tube 7 and, after further amplification, to an output tube 8 and a primary winding 9 of an output transformer 9, 10.

Two output terminals 11 are connected to a secondary winding 10 of the output transformer 9, 10. A recording device, for example, the recording head of a device for magnetic band recording may be connected to the output terminals 11. The oscillatory coil of a loudspeaker 15 is connected via contacts 12, 13 of a switch 17, and in parallel with the output terminals 11, to the secondary winding 10 of the output transformer 9, 10.

The direct voltage set up across resistor 5 is supplied as a control voltage (AGC), by way of a resistor 18, to the grids of the input and intermediate-frequency tubes. Furthermore, said direct voltage controls a tuning indicator tube 24 by way of contacts 19, 20 of the switch 17 and a resistor 22. The terminal of resistor 22 which is connected to the grid of the tube 24 is connected, by way of a capacitor 23, to a resistor 16. The capacitor 23 is connected to ground via the resistor 16. The value of resistor 16 corresponds to the resistance of the oscillatory coil of the loudspeaker 15 and hence is so small as to be substantially negligible with respect to the impedance of the capacitor 23. In the position of the switch 17 shown in the figure, the capacitor 23 is substantially connected to ground, so that the switching element constituted by resistor 22 and capacitor 23 fulfills the function of a smoothing member for the direct voltages applied to the tuning indicator tube 24. In this position of the switch 17, the indicator tube 24 operates as an ordinary optical tuning indicator for the receiver. The audio-frequency voltage occurring at the output of the receiver is reproduced acoustically by means of the oscillatory coil of loudspeaker 15.

If, in the position of the switch 17 shown in the figure, a magnetic recording device is connected to the output terminals 11, the volume is tested acoustically by way of a loudspeaker provided at the output of the receiver.

If the switch 17 is moved to its other position (not shown in the figure), the coil of loudspeaker 15 is made inoperative by the output of the receiver due to interruption of the connection between the contacts 12, 13 and the resistor 16 is switched-in by way of the contacts 12, 14. Furthermore, the connection between the contacts 19, 20 of the switch 17 is interrupted and a connection between the contacts 19, 21 is established. The alternating voltage which is set up across the resistor 16 in the output of the receiver, and which is also supplied by way of the output terminals 11 to the magnetic recording device, is applied by way of capacitor 23 to the grid of indicator tube 24. The grid of the indicator tube 24 is connected to ground via the resistor 22 and the contacts 19, 21, so that the resistor 22 constitutes the grid resistance required for said tube. The RC-member 22, 23 used for smoothing the tuning indication now serves as a coupling member in testing the volume. In this (unshown) position of the switch, the optical indicator tube 24 thus serves as an indicator or as a testing device, for the audio-frequency voltage applied to the recording device, the loudspeaker at the same time being made inoperative. In this (unshown) position of the switch 17, the volume is thus tested solely optically. The switch 17 may be such as to have only two positions in which the contacts 19, 20 and 12, 13 are closed (optical indication of tuning) or the contacts 19, 21 and 12, 14 are closed (optical testing of volume with the loudspeaker switched off). However, it is alternatively possible to utilize a switch having three positions, such that in the first position the contacts 19, 20 and 12, 13, in the second position the contacts 19, 21 and 12, 13, and in the third position the contacts 19, 21 and 12, 14 are closed. In the first position of such a switch the tube 24 operates as an optical tuning indicator with normal operation of the loudspeaker, in the second position the tube 24 operates as an optical device for volume testing with normal operation of the loudspeaker, and in the third position the tube 24 functions as an optical device for volume testing with the loudspeaker switched off.

Since the alternating voltage occurring at the secondary winding 10 of the output transformer 9, 10 is always equivalent to the direct voltages serving for sensitivity control, the use of the tube 24 does not require any additional switching elements for the two purposes. The use of an electronic indicator tube according to the invention thus affords particular advantages.

Instead of optical indication by electron tubes, use may alternatively be made of other optical indicator devices.

While the invention has been described by means of a specific example and in a specific embodiment, I do not wish to be limited thereto, for obvious modifications will occur to those skilled in the art without departing from the spirit and scope of the invention.

I claim:

1. In combination with a receiver having an audio-frequency voltage applied to a loudspeaker and to a recording device, an optical indicator, means for deriving a voltage indicative of the tuning of said receiver, switching means coupled to said indicator for selectively applying said tuning voltage to said indicator to optically indicate the tuning of said receiver, and applying said audio-frequency voltage to said indicator and simultaneously rendering said loudspeaker inoperative to optically indicate the volume of said audio-frequency voltage.

2. An arrangement as set forth in claim 1, wherein said switching means for applying said audio-frequency voltage to said indicator includes a resistor.

3. An arrangement as set forth in claim 1, wherein said optical indicator comprises an electronic tuning indicator tube.

4. An arrangement as set forth in claim 1, wherein said switching means includes a resistor-capacitor circuit selectively serving to smooth said tuning voltage and to integrate the audio-frequency voltage applied to said indicator.

References Cited in the file of this patent

UNITED STATES PATENTS

| 2,144,822 | Van Loon | Jan. 24, 1939 |
| 2,529,980 | Violet | Nov. 14, 1950 |
| 2,557,245 | Zillger | June 19, 1951 |